United States Patent [19]
Fujii et al.

[11] Patent Number: 5,273,836
[45] Date of Patent: Dec. 28, 1993

[54] MAGNETOOPTIC RECORDING MATERIAL

[75] Inventors: Toshitaka Fujii, Toyohashi; Naoshi Horiai; Tadao Tokushima, both of Hamamatsu; Michihiko Kubota, Hamamatsu, all of Japan

[73] Assignee: Yamaha Corporation, Japan

[21] Appl. No.: 885,906

[22] Filed: May 18, 1992

Related U.S. Application Data

[63] Continuation of Ser. No. 578,069, Sep. 5, 1990, abandoned, which is a continuation-in-part of Ser. No. 175,057, Mar. 30, 1988, abandoned.

[30] Foreign Application Priority Data

Apr. 14, 1987 [JP] Japan ................... 62-091643

[51] Int. Cl.$^5$ ................................ G11B 5/66
[52] U.S. Cl. ..................... 428/694 SC; 365/122; 369/13; 369/288; 428/694 LE; 428/900
[58] Field of Search ............... 428/694, 900; 365/122; 369/13, 288

[56] References Cited

U.S. PATENT DOCUMENTS

| 4,440,720 | 3/1984 | Masumoto et al. | 420/459 |
| 4,567,116 | 1/1986 | Sawada et al. | 428/694 |
| 4,803,129 | 2/1989 | Noriai et al. | 428/694 |

FOREIGN PATENT DOCUMENTS

| 3216863 | 11/1982 | Fed. Rep. of Germany . |
| 072153 | 6/1981 | Japan . |
| 199456 | 11/1983 | Japan . |
| 108304 | 6/1984 | Japan . |
| 153859 | 9/1984 | Japan . |
| 089552 | 5/1985 | Japan . |
| 48148 | 3/1986 | Japan . |
| 112251 | 5/1987 | Japan . |
| 132254 | 6/1987 | Japan . |

Primary Examiner—Paul J. Thibodeau
Assistant Examiner—R. Follett
Attorney, Agent, or Firm—Lerner, David, Littenberg, Krumholz & Mentlik

[57] ABSTRACT

Significant improvement in corrosion resistance of a magnetooptic material for electric and electronic applications is achieved by a composition $(RE_a, TM_b)_{1-c-d}M_cBe_d$ of specified content ratios of the components, typically a Tb-Fe-Co type alloy with combined addition of M and Be.

6 Claims, 8 Drawing Sheets

MAGNETOOPTIC RECORDING MATERIAL

CROSS REFERENCE TO RELATED APPLICATION

This is a continuation of application Ser. No. 07/578,069 filed Sep. 5, 1990, now abandoned which is a continuation-in-part of application Ser. No. 07/175,057, filed on Mar. 30, 1988, now abandoned. Applicants incorporate herein by reference the disclosure of that application.

BACKGROUND OF THE INVENTION

The present invention relates to an improved magnetooptic recording material, and, more particularly, to improvement in corrosion resistance of a material used in the field of high density magnetooptic recording.

A wide variety of high density magnetooptic recording media have been developed such as those proposed in Japanese Patent Publication Sho.59-108304. One typical example includes a base plate and a thin coat formed on the base plate having a plurality of easily magnetizable columns formed ar right angles with respect to the base plate. In order to write in signals to such a magnetooptic recording medium, the medium is first treated to have a uniform direction of magnetization over the entire thin coat, and the thin coat then is subjected to local laser beam radiation to raise its temperature up to the Curie point. Under this condition, a weak magnetic field of opposite polarity is applied to the medium in order to invert the direction of magnetization at the heated section Thereafter the medium is cooled down to room temperature. In order to read out signals from such a magnetooptic recording medium, the Kerr effect is utilized. That is, the thin coat of the medium is subjected to polarized laser beam radiation and the difference in light intensity of the reflected beams caused by the difference in the Kerr rotation angle is used for detection of the recorded signals.

Among the various magnetic materials recently proposed for use in the field of high density magnetooptic recording, rare earth metal type alloys and transition metal type alloys have attracted the major attention of those skilled in the art. Tb-Fe-Co alloys are one example. These alloys exhibit easy magnetic inversion because of their relatively low Curie points near 200° C. In addition, no magnetic inversion starts at room temperature because of their relatively high coercive force near 240 kA/m. Further, these alloys assure quite high density recording because of their significant recording stability. These merits induce increased use of these alloys in the field of high density magnetooptic recording.

Despite these significant merits, inclusion of Tb in rare earth metal - transition metal type alloys brings about a significant problem because the active Tb is quite vulnerable to oxidation and, as a consequence, the material is very poor in corrosion resistance, in particular in an electrochemical environment which includes Na+ ion and Cl− ion. The material is easily corroded through contact with human sweat. For improvement in corrosion resistance, Al, Ti or Cr is usually added to the alloy. For appreciable improvement, a great deal of these metals must be added to the alloy. Increased addition of these metals, however, tends to greatly lower the Kerr rotation angle and the coercive force of the resultant magnetooptic recording material.

SUMMARY OF THE INVENTION

It is an object of the present invention to improve the corrosion resistance of a magnetooptic recording material without significant degradation of its magnetic characteristics.

In accordance with the present invention, a magnetooptic recording material has a composition $(RE_a, TM_b)_{1-c-d}M_cBe_d$ in which RE indicates one or more elements chosen from a group consisting of lanthanide elements, Sc and Y; TM indicates one or more elements chosen from a group consisting of Fe and Co; M indicates one or more elements chosen from a group consisting of Zr, Hf, Ta, Cr and Mo; and in which a, b, c and d are atomic ratios and $0.1 \leq a \leq 0.4$, $0.6 \leq b \leq 0.9$, $0.001 \leq c \leq 0.4$, $0.01 \leq d \leq 0.4$ and $a+b=1$.

DESCRIPTION OF THE PREFERRED EMBODIMENTS

As stated above, the magnetooptic recording material contains one or more of the lanthanide elements, i.e., La, Ce, Pr, Nd, Pm, Sm, Eu, Gd, Tb, Dy, Ho, Er, Tm, Yb and Lu; Sc and Y. The material further contains one or more of the elements Fe and Co. The material also contains one or more or the elements Zr, Hf, Ta, Cr and Mo. Finally, the material contains Be.

When a exceeds 0.4, i.e., the atomic ratio of the rare earth elements to the transition metal elements exceeds 40%, the magnetic resistance of the material is too low. This causes large magnetic domains which do not provide sufficient recording density. When a falls below 0.1, inversion of magnetic domains occurs in the writing-in spot and undesirable lowering in C/N (the ratio of carrier waves to noise) inevitably follows.

A magnetooptic material in accordance with the present invention is formed as a thin film having a thickness of 50 to 100 nm on a base plate made of transparent plastics or glass. Sputtering or vacuum evaporation is used for deposition of the thin coat on the base plate. For further improvement of corrosion resistance, an additional thin film may be deposited on the thin coat from a conductive material such as $SiO_2$, AlN, $Si_3N_4$, SiC and $MgF_2$. The Kerr rotation angle may also be enhanced by the presence of such a thin film. Further, a reflective layer may be formed on the thin film in order to utilize the Faraday effect.

The use of Be only, without M, enhances stability of the magnetooptic material against oxidation, but the combined addition of Be and M produces a compound oxide of still higher stability. This product exhibits a high degree of resistance to corrosion under high temperature and humidity conditions. It also exhibits significant resistance to electro-chemical corrosion in which $Na+$ and $Cl-$ ions act. In addition, the product has a large Kerr rotation angle and sufficient coercive force. Thus, a magnetooptic material in accordance with the present invention is advantageously used for high density recording.

The addition of conventional additives, such as Al, Ti and Cr, must occur in large quantities in order to obtain the same level of corrosion resistance, and an adequate Kerr rotation angle cannot be assured.

It also should be noted that Be by itself is very vulnerable to solutions despite its relatively high resistance against vapor and oxygen. The combination proposed by the present invention also solves this problem.

The present invention will be explained in more detail with reference to the following examples.

Various test pieces of magnetooptic recording material having compositions in accordance with the present invention were formed as sputtering or evaporation on a transparent substrate. These test pieces then were subjected to the following tests.

Test 1

Figure 1:
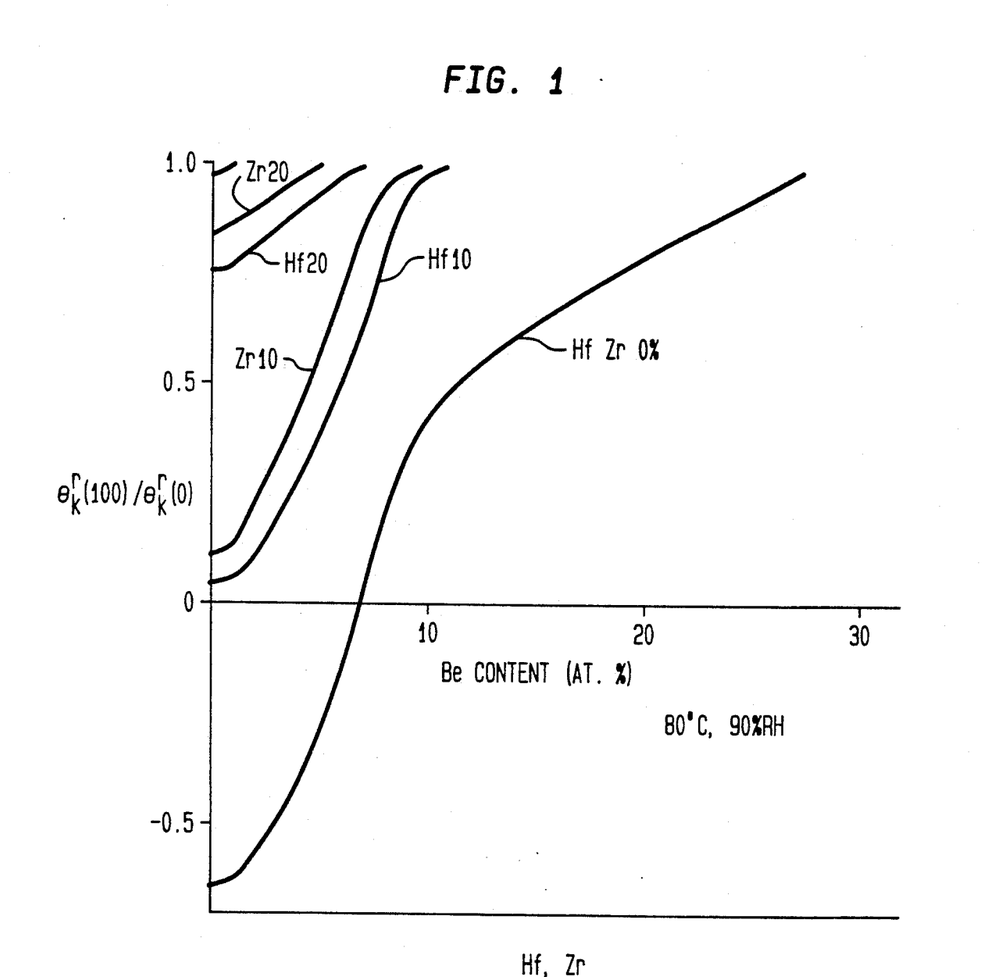
FIG. 1 is a graph showing the relationship between the amounts of Hf or Zr and Be in the composition and the residual Kerr rotation angle after sample conditioning.
Figure 6:
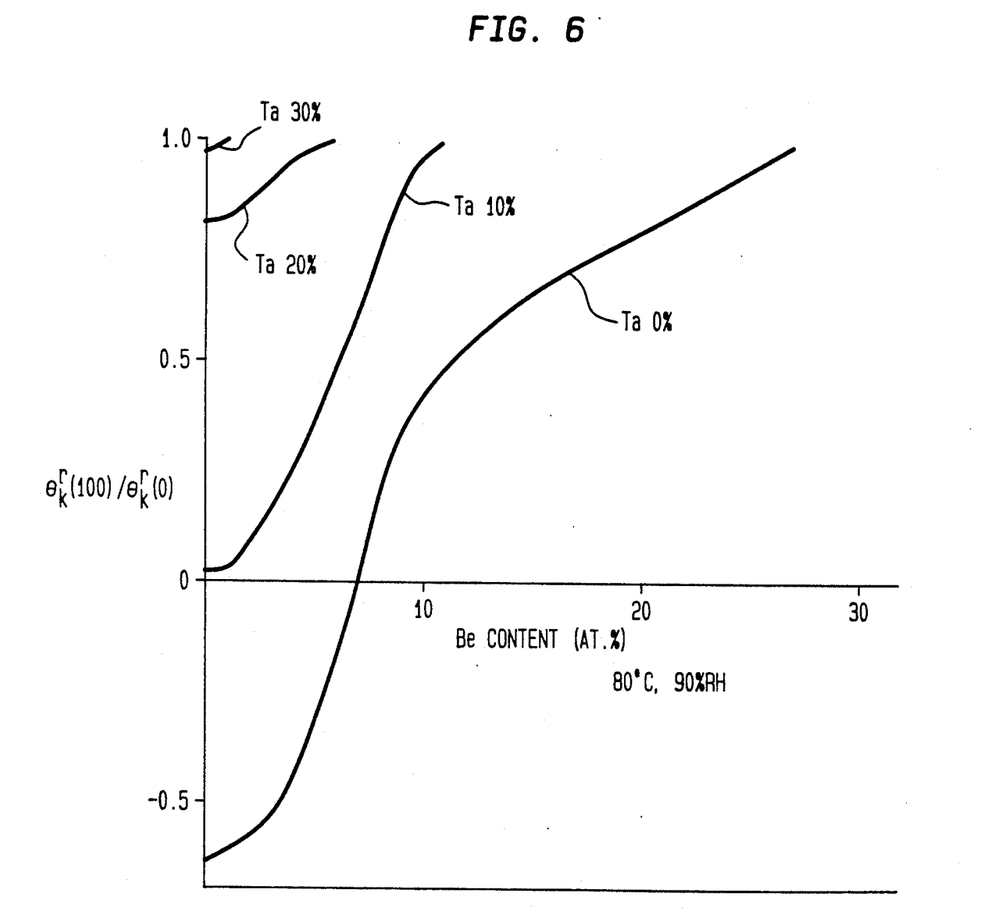
FIG. 6 is a graph showing the relationship between the amounts of Ta and Be in the composition and the residual Kerr rotation angle after sample conditioning.
Figure 9:
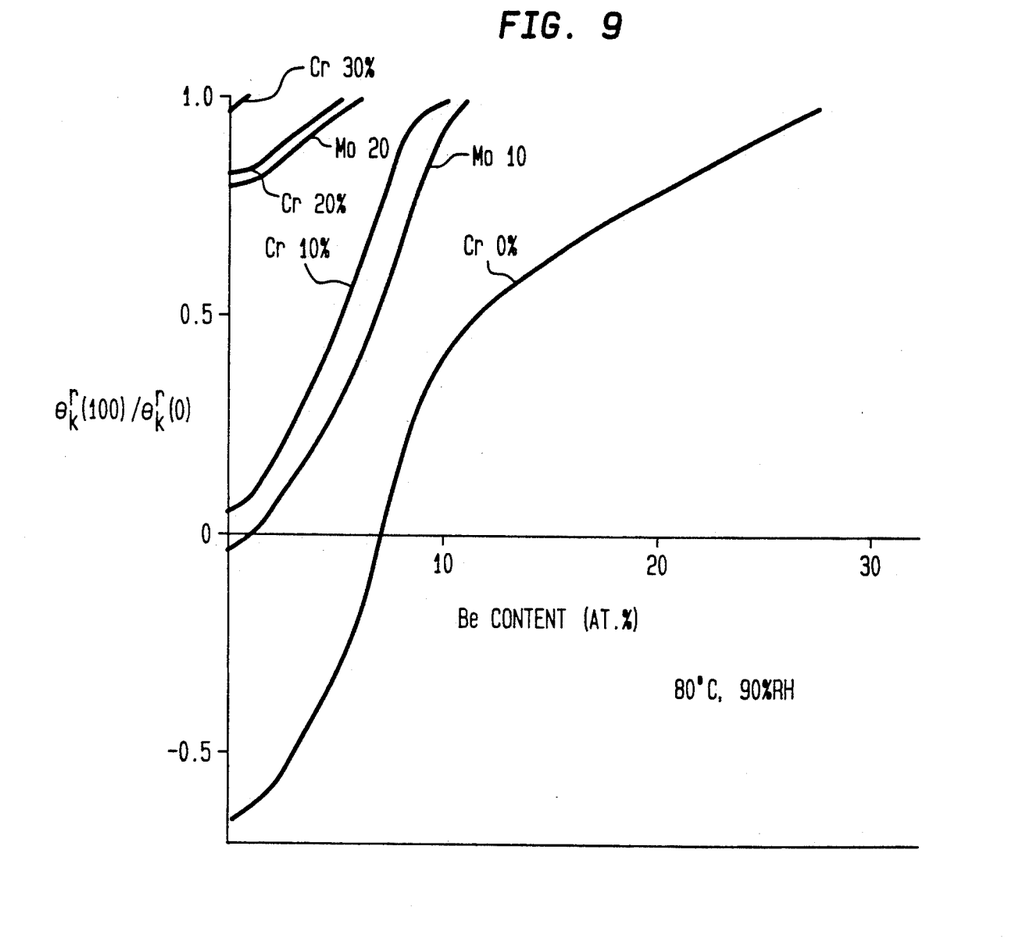
FIG. 9 is a graph showing the relationship between the amounts of Cr or Mo and Be in the composition and the residual Kerr rotation angle after sample conditioning.
Figure 10:
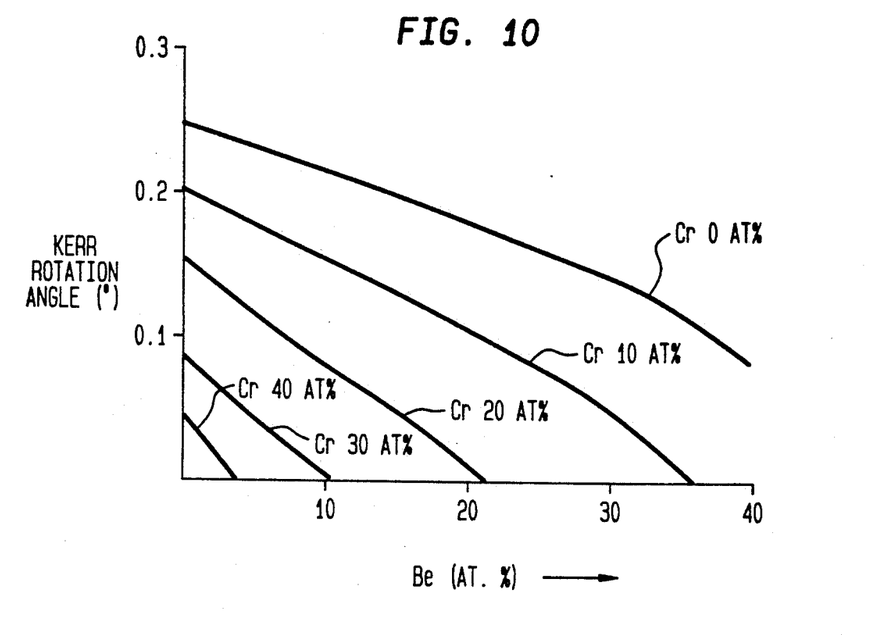
FIG. 10 is a graph showing the relationship between the amounts of Cr and Be in the composition and the Kerr rotation angle.
Figure 11:
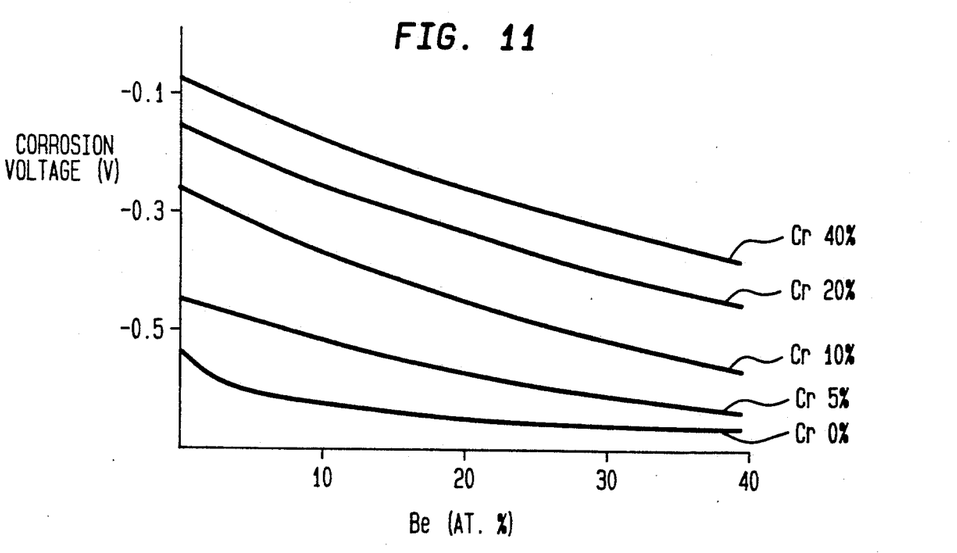
FIG. 11 is a graph showing the relationship between the amounts of Cr and Be in the composition and corrosion voltage.
Figure 12:
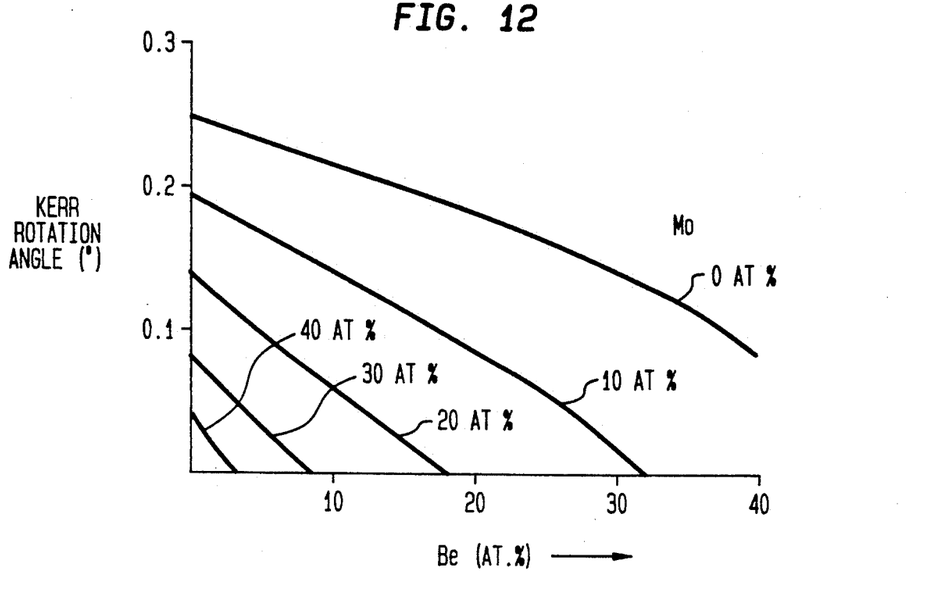
FIG. 12 is graph showing the relationship between the amounts of Mo and Be in the composition and the Kerr rotation angle.
Figure 13:
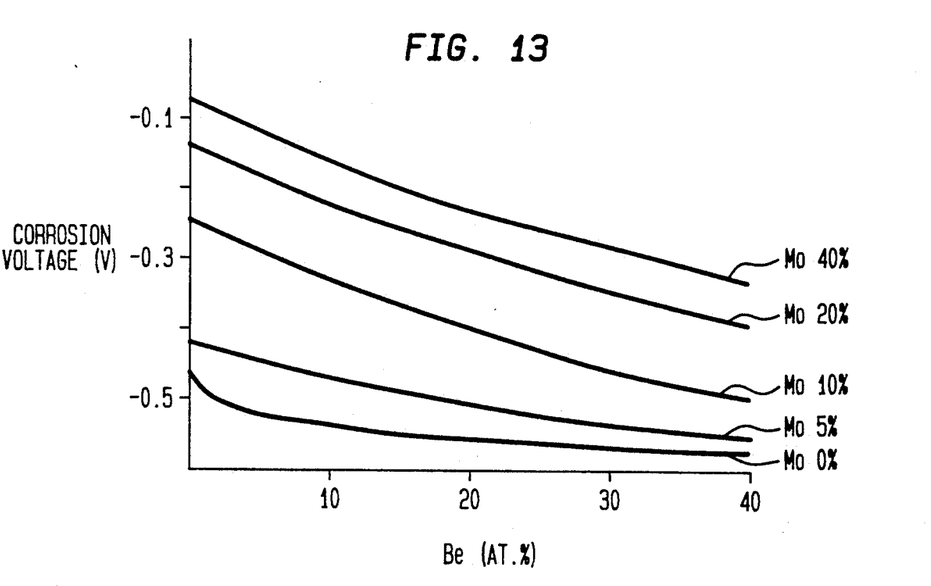
FIG. 13 is a graph showing the relationship between the amounts of Mo and Be in the composition and corrosion voltage.

First, some of the the test pieces were conditioned for 100 hours in a constant environment of 80° C. and 90% RH. After this conditioning, their residual Kerr rotation angles ($\theta_n$) were measured for evaluation of corrosion resistance. This value, for each test piece, was divided by the test pieces residual Kerr rotation angle before conditioning (at time zero). The results of these measurements are shown in FIGS. 1 (for M=Hf or Zr), 6 (for M=Ta) and 9 (for M=Cr or Mo).

Test 2

Figure 2:
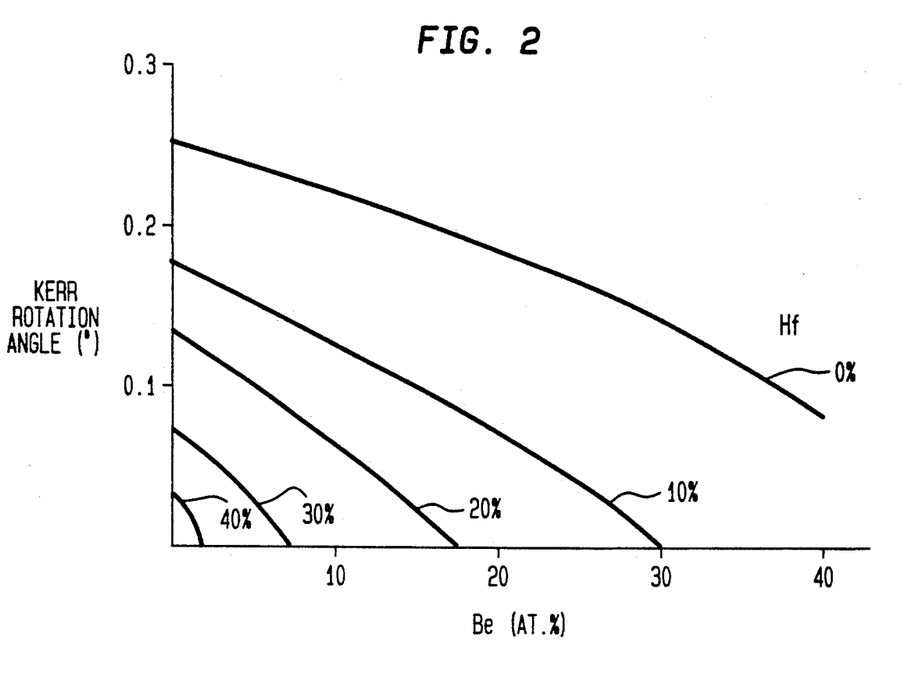
FIG. 2 is a graph showing the relationship between the amounts of Hf and Be in the composition and the Kerr rotation angle.

The Kerr rotation angles or other test pieces without conditioning were measured, and the results of these measurements are given in FIGS. 2 (for M=Hf), 4 (for M=Zr), 7 (for M=Ta), 10 (for M=Cr) and 12 (for M=Mo).

Test 3

Figure 3:
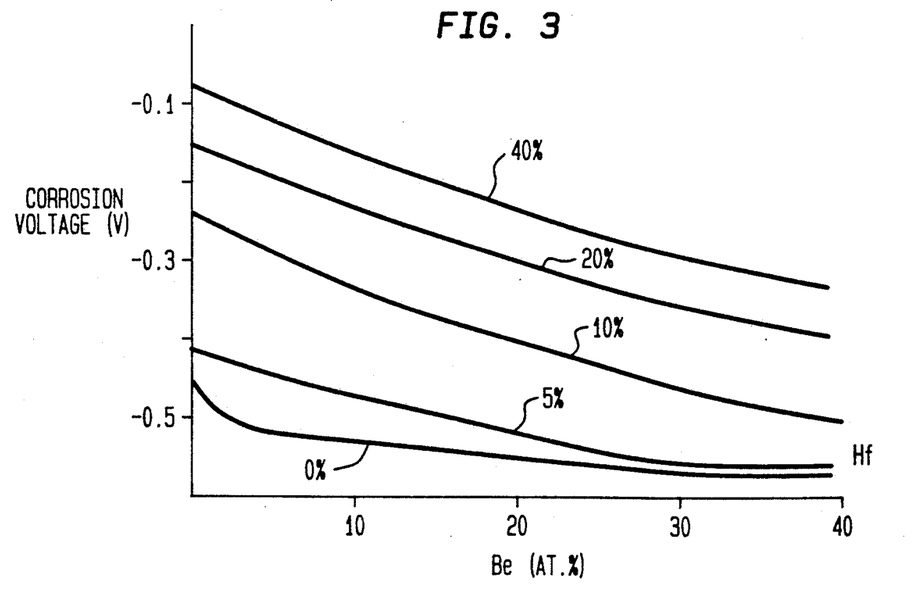
FIG. 3 is a graph showing the relationship between the amounts of Hf and Be in the composition and corrosion voltage.
Figure 4:
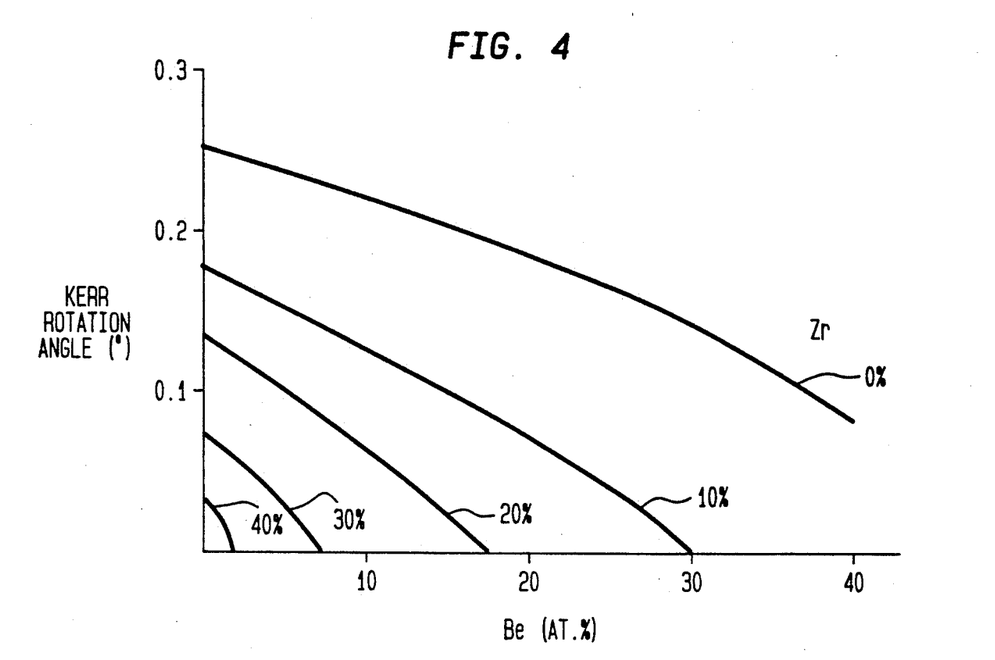
FIG. 4 is a graph showing the relationship between the amounts of Zr and Be in the composition and the Kerr rotation angle.
Figure 5:
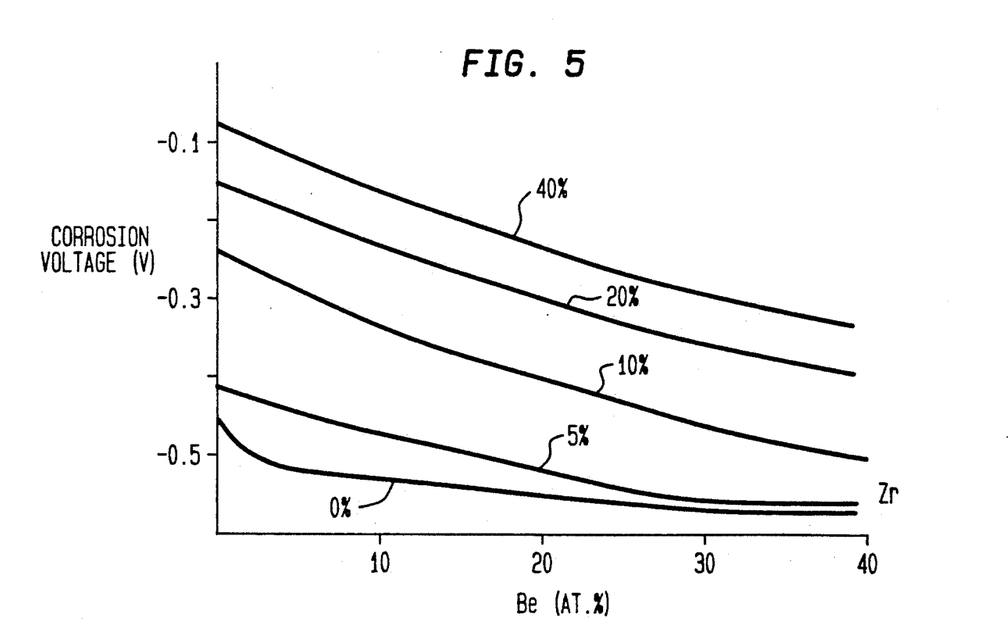
FIG. 5 is a graph showing the relationship between the amount of Zr and Be in the composition and corrosion voltage.

The corrosion voltages of the test pieces subjected to Test 1 were measured in a $NaClO_4$ bath of 0.1 normality. The results of these measurements are given in FIGS. 3 (for M=Hf), 5 (for M=Zr), 8 (for M=Ta), 11 (for M=Cr) and 13 (for M=Mo).

It is clear from FIGS. 1, 6 and 9 that the combined addition of Be with M results in a smaller change in Kerr rotation angle after conditioning than the individual addition of these elements, thereby providing higher corrosion resistance.

It is clear from FIGS. 2, 4, 7, 10 and 12 that the larger the content of Hf, Zr, Ta, Cr and Mo, the smaller the Kerr rotation angle. In practice, a thin film of SiO or SiN may be formed on the thin film as stated above in order to enlarge the apparent Kerr rotation angle. Further, because of improvements in detection heads, even a Kerr rotation angle of about 0.1° can assure sufficient C/N of 50 dB.

THE COMBINATION OF Be WITH Zr, Hf or Ti

Due to lanthanide contraction, Ti is quite different in chemical properties from Zr and Hf. Conversely, Zr is very close in chemical properties to Hf. For example, the covalent bond radius is 1.32 for Ti, 1.45 for Zr and 1.44 for Hf.

It is well known that the addition of a diatomic positive iron oxide such as MgO to $ZrO_2$ produces a stable three dimensional crystal. Addition of BeO to $ZrO_2$ or $HfO_2$ is believed to have a similar effect. No such effect can be observed in the case of $TiO_2$. From this fact, it will be understood that addition of Zr or Hf to Be assures formation of an oxidized surface layer quite durable against electrochemical erosion. See FIGS. 1–5.

THE COMBINATION OF Be WITH Ta, Nb or V

Figure 7:
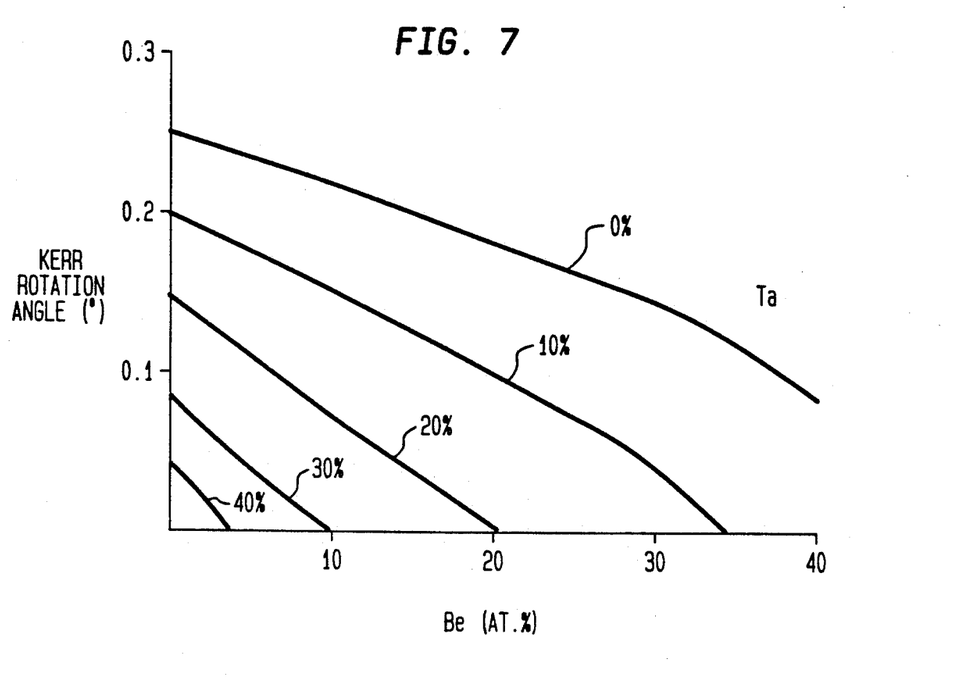
FIG. 7 is a graph showing the relationship between the amounts of Ta and Be in the composition and the Kerr rotation angle.
Figure 8:
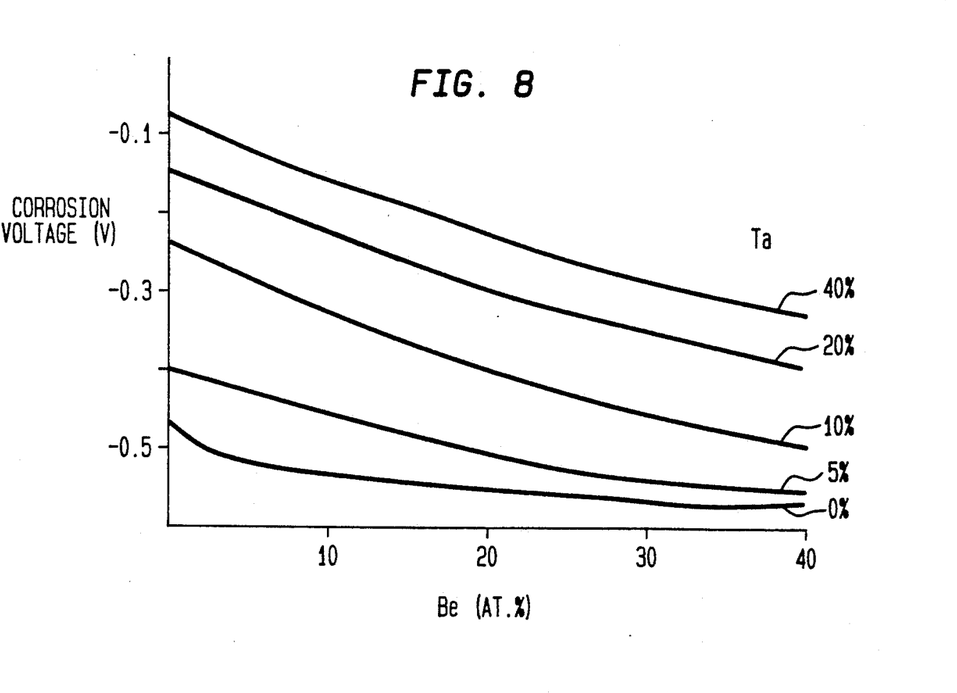
FIG. 8 is a graph showing the relationship between the amounts of Ta and Be in the composition and corrosion voltage.

When combined with a diatomic positive iron metal, Ta and Nb form compound oxides such as $M^{II}(TaO)_2$ and $M^{II}(NbO)_2$, respectively. But does not. As a result of the tests conducted by the inventors, it was confirmed that a Be-Ta combination raises corrosion voltage more than a Ta-Al-Be combination. This is shown in FIGS. 6–8.

THE COMBINATION OF Be WITH Cr, Mo OR W

The combination of a triatomic oxide with a diatomic oxide forms a product called spinel.

The combination of BeO with $Al_2O_3$ forms a kind of spinel. However, when formed under room temperature, resultant Al oxide in the surface layer is not in the form of a complete $Al_2O_3$ and, as a consequence, the compound oxide resulting from combination of $Al_2O_3$ with BeO is rather unstable and exhibits high corrosion voltage.

Mo given in the form of $Mo_2O_3$ forms a compound oxide when combined with BeO but the product is not as stable as in the case of the combination with Cr. W is not given in the form of $W_2O_3$ and, as a consequence, does not produce a stable compound oxide.

It was confirmed that the combination of Be with Cr or Mo assures production of a stable compound oxide on the surface of the material with raised corrosion voltage. This is shown in FIGS. 9–13.

Any content ratio of M below 0.1% and any content ratio of Be below 0.1° cannot assure appreciable improvement in corrosion resistance. Since the Kerr rotation angle generally must be 0.1. or larger, the optimum content ratios of Be and M are in the following ranges:

$$0.01 \leq Be \leq 0.38$$

$$0.005 \leq M \leq 0.25$$

The combined addition of Be with M is highly conducive to improvement in corrosion resistance. Addition of only Be results in low corrosion voltage. Although addition of M raises corrosion voltage, there is a limit to the content ratio of M due to the results given in FIGS. 2, 4, 7, 10 and 12. Thus, the optimum content ratios of Be and M are in the following ranges:

$$0.01 \leq Be \leq 0.38$$

$$0.025 \leq M \leq 0.25$$

Test 4

Various test pieces of magnetoopic recording material were formed having the following compositions:

$$[(Fe_{0.9}Co_{0.1})_{0.75}Tb_{0.25}]_{0.8}M_{0.2}$$

$$[(Fe_{0.9}Co_{0.1})_{0.75}Tb_{0.25}]_{0.8}M_{0.1}Be_{0.1}$$

The element M was chosen from a group consisting of Cr, Ti, Zr, Hf, V, Nb, Ta, Mo, W, Al, Au, Ag, Ru, Rh, Pd, Os, Ir, Pt, Cu, In, Si and Ge.

Each test piece was conditioned for 100 Hr in a constant environment of 80° C.×90% RH and thereafter subjected to measurement of corrosion resistance. For evaluation of the corrosion resistance, a ratio $\theta k(100)/\theta k(0)$ and corrosion voltage (Ecorr) were used. Corrosion voltages of the test pieces were measured in a NaClO$_4$ bath of 0.1 normality. The results are given in the following Table in which $\theta k(0)$ indicates the Kerr rotation angle before conditioning and $\theta k(100)$ indicates the Kerr roration angle after conditioning.

From the Table, it is clear that 20% addition of the element M only to the Tb-Fe-Co type alloy results in insufficient corrosion resistance but that the further 10% addition of Be greatly improves corrosion resistance.

We claim:

1. An improved magnerooptic material comprising a composition defined by $(RE_a, TM_b)_{1-c-d} M_c Be_d$ in which a through d are atomic ratios and RE indicates one or more elements chosen from a group consisting of lanthanide elements, Sc and Y, TM indicates one or more elements chosen from a group consisting of Fe and Co,
   M indicates one or more elements chosen from a group consisting of Zr, Hf, Ta. Cr and Mo, and $$0.1 \leq a \leq 0.4$$

$$0.6 \leq b \leq 0.9$$

$$0.001 \leq c \leq 0.4$$

$$0.01 \leq d \leq 0.4$$

$$a+b=1$$

2. An improved magnetooptic material as in claim 1, in which M is Zr and $$0.01 \leq c \leq 0.28$$

$$0.01 \leq d \leq 0.28$$

3. An improved magnetooptic material as in claim 1, in which M is Hf and $$0.01 \leq c \leq 0.28$$

$$0.01 \leq d \leq 0.28$$

$$0.02 \leq c+d \leq 0.40$$

4. An improved magnetooptic material as in claim 1, in which M is Ta and $$0.01 \leq c \leq 0.28$$

TABLE

| M | $\theta k(100)/\theta k(0)$ | | Corrosion voltage E corr (mv) |
|---|---|---|---|
| | M20% | M10% + Be10% | M10 + Be10% |
| Cr | 0.8 | 1.0 | −310 |
| Ti | 0.78 | 0.98 | −340 |
| Zr | 0.85 | 1.0 | −320 |
| Hf | 0.76 | 0.99 | −330 |
| V | 0.65 | 0.81 | −380 |
| Nb | 0.78 | 0.97 | −350 |
| Ta | 0.81 | 0.96 | −320 |
| Mo | 0.81 | 0.95 | −330 |
| W | 0.78 | 0.88 | −390 |
| Al | 0.67 | 0.87 | −400 |
| Au | 0.65 | 0.82 | −410 |
| Ag | 0.65 | 0.85 | −430 |
| Ru | 0.71 | 0.83 | −390 |
| Rh | 0.80 | 0.95 | −380 |
| Pd | 0.79 | 0.88 | −380 |
| Os | 0.70 | 0.81 | −400 |
| Ir | 0.67 | 0.84 | −410 |
| Pt | 0.73 | 0.98 | −390 |
| Cu | 0.68 | 0.95 | −410 |
| In | 0.74 | 0.89 | −420 |
| Si | 0.70 | 0.92 | −390 |
| Ge | 0.71 | 0.92 | −400 |

$$0.01 \leq d \leq 0.30$$

$$0.02 - c + d \leq 0.40$$

5. An improved magnetooptic material as in claim 1, in which M is Cr and $$0.01 \leq c \leq 0.28$$

$$0.01 \leq d \leq 0.30$$

$$0.02 \leq c+d \leq 0.40$$

6. An improved magnetooptic material as in claim 1, in which M is Mo and $$0.01 \leq c \leq 0.28$$

$$0.01 \leq d \leq 0.30$$

$$0.02 \leq c+d \leq 0.40$$

* * * * *

UNITED STATES PATENT AND TRADEMARK OFFICE
CERTIFICATE OF CORRECTION

PATENT NO. : 5,273,836           Page 1 of 2
DATED      : December 28, 1993
INVENTOR(S): Fujii et al.

It is certified that error appears in the above-identified patent and that said Letters Patent is hereby corrected as shown below:

Column 3, line 48, "of" should read --by--.

Column 3, line 56, "($\theta$n)" should read --$(\theta_r^k)$--

Column 3, line 58, "pieces" should read --piece's--.

Column 4, line 41, after "But" insert --V--.

Column 4, line 67, "0.1°" should read --0.1%--.

Column 5, line 1, "0.1." should read --0.1°--.

Column 5, line 49, "magnerooptic" should read --magnetooptic--.

Column 5, line 57, "Ta." should read --Ta,--.

Column 6, line 8, insert --$0.02 \leq c + d \leq 0.40$--.

UNITED STATES PATENT AND TRADEMARK OFFICE
CERTIFICATE OF CORRECTION

PATENT NO. : 5,273,836
DATED : December 28, 1993
INVENTOR(S) : Fujii et al.

It is certified that error appears in the above-identified patent and that said Letters Patent is hereby corrected as shown below:

Column 6, in the TABLE in the column heading "Corrosion voltage" "M10" should read --M10%--.

Column 6, the TABLE, on lines 22-44 should be deleted and inserted in Column 5, following line 46.

Column 6, line 47, "$0.02 - c + d \leq 0.40$" should read --$0.02 \leq c + d \leq 0.40$--.

Signed and Sealed this

Thirty-first Day of May, 1994

Attest:

BRUCE LEHMAN

Attesting Officer     Commissioner of Patents and Trademarks